(12) United States Patent
Hager et al.

(10) Patent No.: US 7,937,932 B2
(45) Date of Patent: May 10, 2011

(54) METERING VALVE ASSEMBLY AND METHOD FOR OPERATING A METERING VALVE ASSEMBLY

(75) Inventors: Bernhard Hager, Puch (AT); Michael Offenhuber, Adnet (AT); Franz Lackner, Flachau (AT); Johann Siller, Puch bei Hallein (AT); Leopold Bernegger, Adnet (AT)

(73) Assignee: Robert Bosch GmbH, Stuttgart (DE)

( * ) Notice: Subject to any disclaimer, the term of this patent is extended or adjusted under 35 U.S.C. 154(b) by 749 days.

(21) Appl. No.: 11/630,477

(22) PCT Filed: Apr. 1, 2005

(86) PCT No.: PCT/EP2005/051476
§ 371 (c)(1),
(2), (4) Date: Nov. 5, 2007

(87) PCT Pub. No.: WO2006/000477
PCT Pub. Date: Jan. 5, 2006

(65) Prior Publication Data
US 2009/0126348 A1 May 21, 2009

(30) Foreign Application Priority Data

Jun. 24, 2004 (DE) .......................... 10 2004 030 441

(51) Int. Cl.
*F01N 3/00* (2006.01)
(52) U.S. Cl. ................. 60/286; 60/274; 60/295; 60/301; 60/303
(58) Field of Classification Search .................... 60/274, 60/286, 301, 303, 295
See application file for complete search history.

(56) References Cited

U.S. PATENT DOCUMENTS

| | | | |
|---|---|---|---|
| 5,884,475 A | | 3/1999 | Hofmann et al. |
| 6,063,350 A | * | 5/2000 | Tarabulski et al. ......... 423/239.1 |

FOREIGN PATENT DOCUMENTS

| | | |
|---|---|---|
| DE | 44 32 577 A1 | 3/1996 |
| DE | 101 50 518 C1 | 5/2003 |
| DE | 102 54 981 A1 | 6/2004 |
| WO | WO 96/08639 A1 | 3/1996 |
| WO | WO03033111 * | 4/2003 |

* cited by examiner

Primary Examiner — Thomas E. Denion
Assistant Examiner — Diem Tran
(74) Attorney, Agent, or Firm — Ronald E. Greigg

(57) ABSTRACT

A metering valve assembly having a metering valve for metering an aqueous urea solution for posttreatment of exhaust gases from internal combustion engines, the liquid being capable of being fed in a feeding direction to the metering valve and a mixing chamber being provided, in which the liquid is miscible with a gas in a gas flow. The metering valve is evacuatable contrary to the feeding direction.

15 Claims, 1 Drawing Sheet

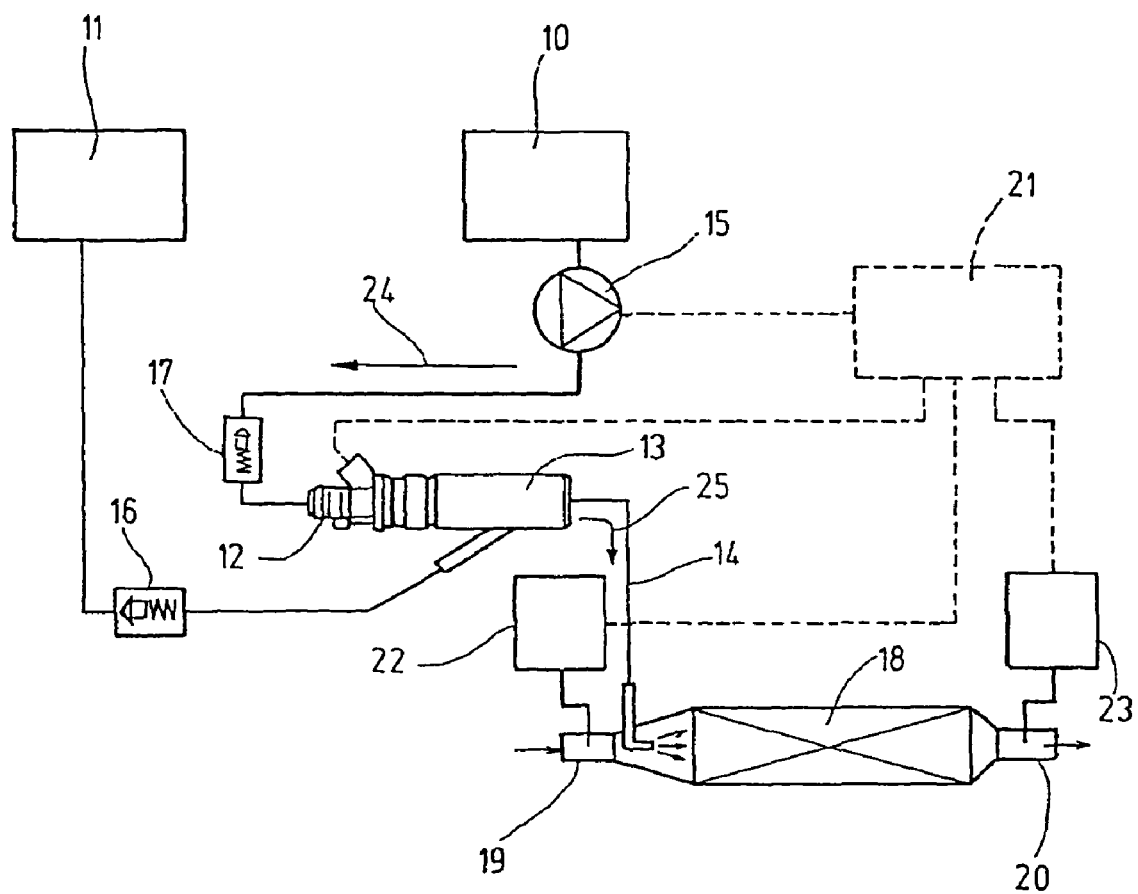

METERING VALVE ASSEMBLY AND METHOD FOR OPERATING A METERING VALVE ASSEMBLY

CROSS-REFERENCE TO RELATED APPLICATION

This application is a 35 USC 371 application of PCT/EP 2005/051476 filed on Apr. 1, 2005.

BACKGROUND OF THE INVENTION

1. Field of the Invention

The invention is based on a metering valve assembly and on a method for operating a metering valve assembly for metering fluids.

2. Description of the Prior Art

For reducing the nitrogen oxides contained in an exhaust gas of an internal combustion engine, a method for selective catalytic reduction has proved advantageous for engines that are operated with air excess. In this method, the nitrogen oxides together with ammonia are converted in a selective catalytic converter into nitrogen and water. The reducing agent needed for the catalytic conversion of the nitrogen oxides is carried in the vehicle in the form of an aqueous urea solution, instead of ammonia, from which solution the ammonia can be liberated by hydrolysis of the urea solution in whatever quantity is required for the conversion. However, it is problematic that depending on the urea concentration, the risk exits that the aqueous urea solution will freeze at certain temperatures.

From International Patent Disclosure WO 02/42616 A1, a metering valve for an aqueous urea solution is known in whose work chamber walls or elements which at least in part yield under pressure are provided and can compensate reversibly for a pressure occurring with ice formation in the work chamber.

SUMMARY AND ADVANTAGES OF THE INVENTION

In the metering valve assembly of the invention, having a metering valve for metering a liquid, in particular for metering an aqueous urea solution for posttreatment of exhaust gases from internal combustion engines, the metering valve can be evacuated counter to the feeding direction. An unwanted ice formation and in particular a buildup of excessive ice pressures in the arrangement at low outdoor temperatures, which can damage the metering valve, is avoided. The metering valve is preferably located upstream of a mixing chamber, in which the liquid is mixed with the gas to form an aerosol.

If a pump is provided which evacuates the metering valve of the liquid counter to the feeding direction in normal operation, the liquid can be returned to a tank, which reduces the consumption of the liquid and is less polluting, since in the evacuation no liquid is released to the outside. Especially advantageously, the metering valve is located upstream of a mixing chamber, in terms of the feeding direction in normal operation, and in this mixing chamber an aerosol is formed from the liquid and a gas and is added as a reducing agent to a substance to be reduced, such as exhaust gas. Preferably, a gas flow is oriented in the feeding direction, while the metering valve is being evacuated by the pump. The gas flow prevents an aspiration of exhaust gases into the metering valve assembly and instead reliably delivers the appropriate gas, preferably compressed air from the vehicle, while the aqueous urea solution is removed from the arrangement and delivered for instance to a tank.

Preferably, the pump is embodied as a feed pump with a reversible feeding direction, so that a component present in the arrangement can be used for evacuating the arrangement, and no additional installation space is required.

Especially advantageously, the metering valve is actuatable in pulse-width-modulated fashion. The metering valve is preferably closed when without current. When the vehicle engine is shut off, the arrangement is protected upstream of the metering valve against contamination and soiling without further effort or expense.

In the method of the invention for operating a metering valve assembly for metering a liquid, in particular for metering an aqueous urea solution for posttreatment of exhaust gases from internal combustion engines, it is proposed that for the evacuation, the metering valve is evacuated counter to a feeding direction in normal operation. The method is reliable and safe in process terms.

Preferably, a gas flow in the feeding direction is maintained during the evacuation, so that aspiration of exhaust gases can be avoided when the metering valve is evacuated counter to the feeding direction.

In a favorable embodiment, the liquid is aspirated from the metering valve via a pump. Advantageously, for this purpose the direction of rotation of a feed pump is reversed. Optionally, a second pump may also be provided.

In a further favorable embodiment, upon shutoff of the arrangement, with gas flowing, a pressure of the mixture of liquid and gas is diminished and the mixing chamber is evacuated. Preferably, the liquid column in the metering valve is forced back in the direction of a pump, or a filter that may be present, counter to the feeding direction in normal operation, by means of the pressure of the gas in the mixing chamber.

It is understood that the embodiments may be combined with one another, which makes a demand-based mode of operation of the metering valve assembly possible.

BRIEF DESCRIPTION OF THE DRAWINGS

Further embodiments, aspects and advantages of the invention will become apparent, from exemplary embodiments of the invention that are described below, with reference to the sole drawing FIGURE which schematically shows a preferred metering valve assembly in an exhaust gas system of a motor vehicle.

The sole FIGURE of the drawing shows a preferred metering valve assembly in an exhaust gas system of a motor vehicle.

DESCRIPTION OF THE PREFERRED EMBODIMENTS

A preferred metering valve assembly in an exhaust gas system of a motor vehicle is shown in simplified form in the drawing. An aqueous urea solution, as a reducing agent for exhaust gas posttreatment, is stored in a urea tank 10 and can be introduced into a metering valve 12 via a feed pump 15 and a line, not identified by reference numeral, and a check valve 17. The feed pump 15 feeds the aqueous urea solution in a feeding direction indicated by an arrow 24. In a compressed air tank 11, compressed air is stored, which can be introduced via a line, not identified by reference numeral, and a check valve 16 into a mixing chamber 13 connected to the metering valve 12. Via an aerosol line 14, the mixture of aqueous urea and air formed in the mixing chamber 13 can be introduced into an exhaust gas inlet region 19 of a catalytic converter 18.

An exhaust gas flow direction in the exhaust gas inlet region 19 and in the exhaust gas outlet region 20 is represented by respective arrows. In the exhaust gas inlet region 19 and the exhaust gas outlet region 20, typical sensors 22 and 23, respectively, are provided, such as pressure sensors, temperature sensors, lambda sensors, and the like which are connected by means of signal lines, represented by dashed lines and not identified by reference numerals, to a control unit 21. The control unit 21 as a function of operating parameters and/or operating states, also triggers the metering valve 12 and the feed pump 15; the compressed air tank 11 is triggerable as well. The metering valve 12 is preferably actuatable in pulse-width-modulated fashion.

In a first embodiment of the invention, upon shutoff of the vehicle engine, the mixing chamber 13 can be subjected to a gas flow, and the metering valve 12 can be evacuated counter to the feeding direction 24. The flow of compressed air through the mixing chamber 13 is maintained in the flow direction 25 that is specified during operation, while the direction of rotation of the feed pump 15 is reversed and the urea solution is fed back into the urea tank 10 counter to the usual feeding direction 24 for operation. As a result of the flow of compressed air in the mixing chamber 13, an aspiration of exhaust gas from the catalytic converter 18 is avoided. Optionally, a second pump may also be provided, for pumping the urea solution out of the mixing chamber 13 and the metering valve 12.

In a further embodiment of the invention, the metering valve 12 is intentionally blown clear by means of the compressed air via the mixing chamber 13, so that a liquid column existing in lines of the metering valve 12 can be thrust back out of the metering valve 12 in the direction of the feed pump 15. After the shutoff of the vehicle engine, the flow of compressed air is maintained in its flow direction 25 that is appropriate for operation. The pressure of the aqueous urea solution in the system is diminished, and the mixing chamber 13 is evacuated. After the evacuation of the mixing chamber 13, the metering valve 12 is opened, so that the pressure of the compressed air, via the mixing chamber 13, can force the liquid column in the metering valve 12 back into the line region upstream of the metering valve 12, counter to the feeding direction 24. Next, the metering valve 12 is closed, and the gas flow is shut off. In this embodiment, it is expedient that either the check valve 17 can be bypassed (not shown), or else no check valve 17 is provided.

The foregoing relates to a preferred exemplary embodiment of the invention, it being understood that other variants and embodiments thereof are possible within the spirit and scope of the invention, the latter being defined by the appended claims.

The invention claimed is:

1. A metering valve assembly having a metering valve (12) for metering an aqueous urea solution for the post-treatment of exhaust gases from combustion engines, the aqueous urea solution being deliverable in a delivery direction (24) via a feed pump (15) to the metering valve (12), and a mixing chamber (13) being provided, in which the aqueous urea solution can be mixed with a gas, the metering valve (12) being drain-able oppositely to the delivery direction (24), characterized in that a second pump is provided which pumps the liquid from mixing chamber (13) and the metering valve (12).

2. The metering valve assembly as defined by claim 1, wherein the metering valve is actuatable in pulse-width-modulated fashion.

3. The metering valve assembly as defined by claim 1, including means for supplying gas flow to the mixing chamber so that the aqueous urea solution can be mixed with a gas, and wherein upon evacuation of the metering valve, the means supplying gas flow to the mixing chamber is operable to produce a gas flow in the feeding direction.

4. The metering valve assembly as defined by claim 1, including means for supplying a gas flow to the mixing chamber (13), wherein upon evacuation of the metering valve, the means supplying gas flow to the mixing chamber is operable to produce a gas flow in the feeding direction.

5. A method for operating a metering valve arrangement for metering an aqueous urea solution for the post-treatment of exhaust gases from combustion engines, the aqueous urea solution being delivered in a delivery direction (24) via a feed pump (15) to the metering valve (12) and the aqueous urea solution being mixed with a gas in a mixing chamber (13), the metering valve (12) being drained against the delivery direction (24), the method characterized in that the aqueous urea solution is pumped from the mixing chamber (13) and the metering valve (12) via a second pump.

6. The method as defined by claim 5, wherein gas is supplied to the mixing chamber during the post treatment of the exhaust gases, and during the draining, the gas flow is maintained in a flow direction prevailing in normal operation.

7. The method as defined by claim 6, wherein upon shutoff of post treatment of the exhaust gases, a pressure of the mixture of liquid and gas is reduced and the mixing chamber is evacuated of the liquid.

8. The method as defined by claim 6, wherein the liquid is thrust out of the metering valve counter to the feeding direction by gas pressure from the mixing valve.

9. The method as defined by claim 5, wherein upon shutoff of post treatment of the exhaust gases, a pressure of the mixture of liquid and gas is reduced and the mixing chamber is evacuated of the liquid.

10. The method as defined by claim 9, wherein the liquid is thrust out of the metering valve counter to the feeding direction by gas pressure from the mixing valve.

11. A metering valve assembly having a metering valve (12) for metering an aqueous urea solution for the post-treatment of exhaust gases from combustion engines, the aqueous urea solution being deliverable in a delivery direction (24) via a feed pump (15) and a check valve (17) to the metering valve (12), and a mixing chamber (13) being provided, in which the aqueous urea solution can be mixed with a gas, the metering valve (12) being drain-able oppositely to the delivery direction (24), characterized in that the feed pump (15) has a reversible feeding direction and the check valve (17) is configured to be bypassed.

12. The metering valve assembly as defined by claim 11, wherein the metering valve is actuatable in pulse-width-modulated fashion.

13. The metering valve assembly as defined by claim 11, including means for supplying a gas flow to the mixing chamber (13), wherein upon evacuation of the metering valve, the means supplying gas flow to the mixing chamber is operable to produce a gas flow in the feeding direction.

14. A method for operating a metering valve arrangement for metering an aqueous urea solution for the post-treatment of exhaust gases from combustion engines, the aqueous urea solution being delivered in a delivery direction (24) via a feed pump (15) and a check valve (17) to the metering valve (12) and the aqueous urea solution being mixed with a gas in a mixing chamber (13), the metering valve (12) being drained against the delivery direction (24), the method characterized in that the aqueous urea solution is aspirated from the metering valve (12) via the feed pump (15) having a reversible feeding direction and the check valve (17) is bypassed.

15. The method as defined by claim 14, wherein upon shutoff of post treatment of the exhaust gases, a pressure of the mixture of liquid and gas is reduced and the mixing chamber is evacuated of the liquid.

* * * * *